(12) United States Patent
Chuang (10) Patent No.: US 7,216,410 B2
(45) Date of Patent: May 15, 2007

(54) APPARATUS FOR INSTALLING AN OPTIONAL ELEMENT TO A BICYCLE

(76) Inventor: Louis Chuang, 8th Floor-4, No. 20, Ta Lon Road, Taichung (TW)

( * ) Notice: Subject to any disclaimer, the term of this patent is extended or adjusted under 35 U.S.C. 154(b) by 0 days.

(21) Appl. No.: 10/907,938

(22) Filed: Apr. 21, 2005

(65) Prior Publication Data

US 2006/0196322 A1 Sep. 7, 2006

(30) Foreign Application Priority Data

Mar. 2, 2005 (TW) ............................... 94106360 A (51) Int. Cl.
  *B21D 39/03* (2006.01)
  *B23P 11/00* (2006.01)
  *B62J 39/00* (2006.01)
  *B62J 7/00* (2006.01)
  *B62J 9/00* (2006.01)
  *B62J 11/00* (2006.01)

(52) U.S. Cl. ............... 29/428; 280/288.4; 224/419

(58) Field of Classification Search ............ 29/428; 280/288.4, 304.5; 224/412, 419, 420, 425, 224/427
See application file for complete search history.

(56) References Cited

U.S. PATENT DOCUMENTS

| | | | | |
|---|---|---|---|---|
| 4,274,649 A * | 6/1981 | Vanderhorst et al. | ........ | 280/204 |
| 4,448,435 A * | 5/1984 | Hon | ............. | 280/278 |
| 5,234,143 A * | 8/1993 | Mahvi et al. | ............... | 224/415 |
| 5,303,944 A * | 4/1994 | Kalmus | .................... | 280/288.4 |
| 5,383,677 A * | 1/1995 | Thomas et al. | .......... | 280/288.4 |
| 5,575,443 A * | 11/1996 | Honeycutt | ............... | 248/231.9 |
| 5,649,657 A * | 7/1997 | Chuang | ....................... | 224/430 |
| 5,887,943 A * | 3/1999 | Lee | ........................ | 297/215.12 |
| 6,398,247 B1 * | 6/2002 | Kuo | ........................ | 280/288.4 |
| 6,712,376 B2 * | 3/2004 | Eberhardt et al. | .......... | 280/293 |
| 6,749,212 B2 * | 6/2004 | Mock et al. | ................. | 280/292 |
| 6,886,845 B2 * | 5/2005 | Chao | ........................... | 280/278 |
| 6,918,606 B2 * | 7/2005 | Petrishe | ...................... | 280/293 |
| 6,972,042 B2 * | 12/2005 | Benson | ........................ | 623/38 |
| 6,976,690 B2 * | 12/2005 | Freeman | ..................... | 280/204 |
| 6,983,947 B2 * | 1/2006 | Asbury et al. | .............. | 280/204 |
| 2002/0053780 A1 * | 5/2002 | Weisz et al. | ................. | 280/287 |
| 2002/0096858 A1 * | 7/2002 | Shaw | ........................ | 280/293 |
| 2003/0080534 A1 * | 5/2003 | Freeman | ..................... | 280/495 |
| 2003/0155737 A1 * | 8/2003 | Mock et al. | ................. | 280/204 |
| 2004/0145147 A1 * | 7/2004 | Asbury et al. | .............. | 280/204 |
| 2004/0187627 A1 * | 9/2004 | Bass et al. | ................. | 74/551.3 |
| 2004/0212171 A1 * | 10/2004 | Chao | .......................... | 280/278 |
| 2005/0035573 A1 * | 2/2005 | Petrishe | ................... | 280/288.4 |
| 2005/0263667 A1 * | 12/2005 | Fisher et al. | ................. | 248/534 |
| 2006/0079965 A1 * | 4/2006 | Benson | ........................ | 623/38 |
| 2006/0118693 A1 * | 6/2006 | Fisher et al. | ................. | 248/534 |

\* cited by examiner

*Primary Examiner*—David P. Bryant
*Assistant Examiner*—Christopher M. Koehler
(74) *Attorney, Agent, or Firm*—Alan Kamrath; Kamrath & Associates PA (57) ABSTRACT

An apparatus is disclosed for installing an optional element to a portion of a frame of a bicycle. The apparatus includes an insert formed on the optional element and a socket extending from the portion of the frame of the bicycle in a longitudinal direction of the bicycle. The insert can be inserted into the socket so that the rotation and movement of the insert in the socket is allowed. A quick release is installed on the socket in order to cause the socket to clamp the insert so that the rotation and movement of the insert in the socket is restrained.

9 Claims, 11 Drawing Sheets

APPARATUS FOR INSTALLING AN OPTIONAL ELEMENT TO A BICYCLE

BACKGROUND OF INVENTION

1. Field of Invention

The present invention relates to an apparatus for installing an optional element on a bicycle.

2. Related Prior Art

In Taiwanese Patent Publication No. 445971 is disclosed a device for installing a rack 20 on a bicycle 10. The bicycle includes a mount 11 formed on the seat tube of the bicycle 10. The mount 11 includes a dovetail groove 111 defined therein, a stop 112 formed below the dovetail groove 111, and a screw hole 113 communicated with the dovetail groove 111. The rack 20 includes a connector 21 formed at an end. The connector 21 includes a dovetail 211 for sliding into the dovetail groove 111 and resting on the stop 112. A screw hole 212 is defined in the dovetail 211. A screw 214 can be driven into the screw hole 212 through the screw hole 113 in order to keep the dovetail 211 in the dovetail groove 111. Several problems are however encountered in the manufacturing and use of this conventional apparatus. Firstly, it is expensive to cut the dovetail groove 111 into the mount 11 by means of milling. Secondly, it is expensive to form the dovetail 211 on the connector 21 by means of milling. Thirdly, the rack 20 cannot be rotated on the bicycle 10 and will occupy a lot of space if it is used in a collapsible bicycle.

The present invention is therefore intended to obviate or at least alleviate the problems encountered in the prior art.

SUMMARY OF INVENTION

According to the present invention, an apparatus is disclosed for installing an optional element to a portion of a frame of a bicycle. The apparatus includes an insert formed on the optional element and a socket extending from the portion of the frame of the bicycle in a longitudinal direction of the bicycle. The insert can be inserted into the socket so that rotation and movement of the insert in the socket are allowed. A quick release is installed on the socket in order to cause the socket to clamp the insert so that the rotation and movement of the insert in the socket are restrained.

An advantage of the apparatus of the present invention is that the socket and the insert can be made at low costs.

Another advantage of the apparatus of the present invention is that the use of the quick release ensures convenient operation.

Other advantages and novel features of the invention will become more apparent from the following detailed description in conjunction with the attached drawings.

BRIEF DESCRIPTION OF DRAWINGS

The present invention will be described through detailed description of embodiments referring to the drawings.

DETAILED DESCRIPTION OF EMBODIMENTS

Figure 1:
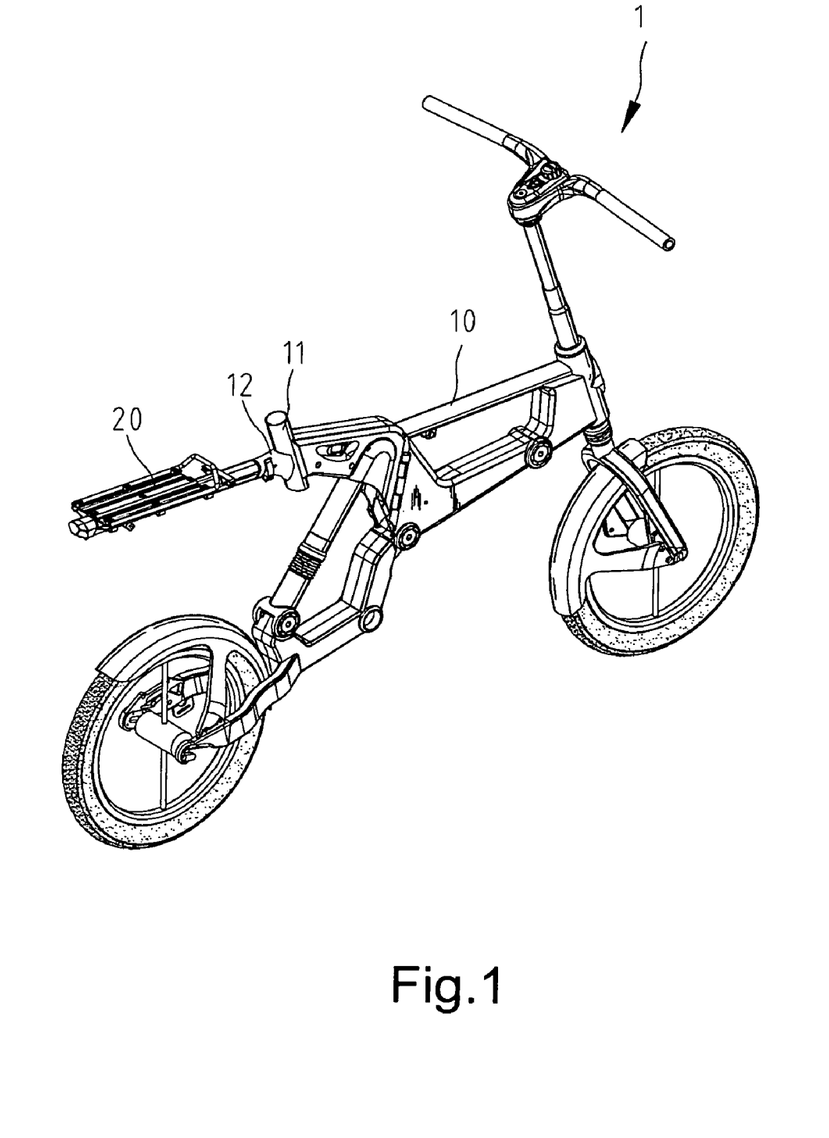
FIG. 1 is a perspective view of a collapsible bicycle equipped with an apparatus for installing an optional element thereon according to a first embodiment of the present invention.

Referring to FIG. 1, a collapsible bicycle 1 includes a frame 10. An optional element is installed on the frame 10 by an apparatus according to a first embodiment of the present invention. In the first embodiment, the optional element is a rack 20, and the rack 20 is installed on the seat tube 11 of the frame 10 of the bicycle 1.

Figure 2:
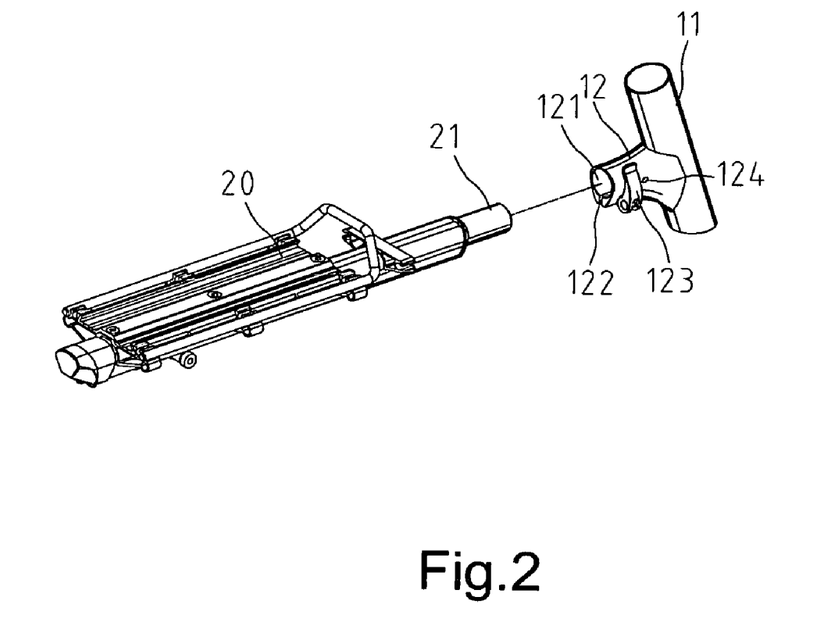
FIG. 2 is an exploded view of the apparatus shown in FIG. 1.
Figure 3:
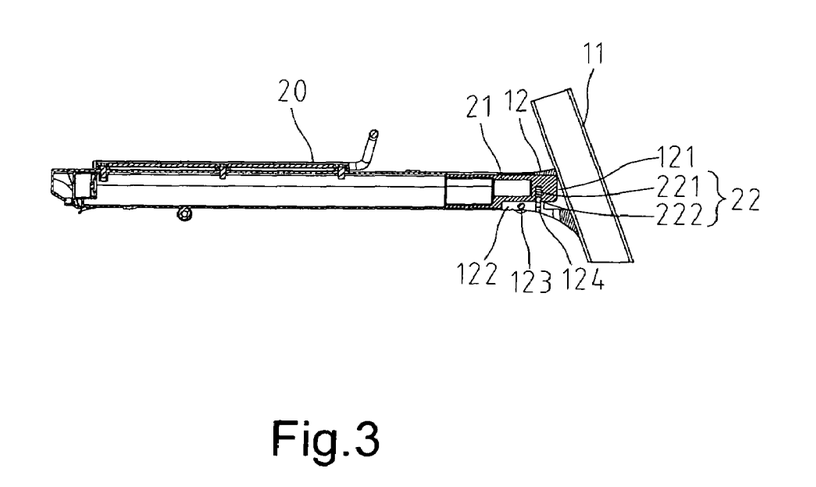
FIG. 3 is a cross-sectional view of the apparatus shown in FIG. 2.

Referring to FIGS. 2 and 3, the apparatus includes a socket 12 formed on the seat tube 11 and an insert 21 formed on the optional element 20 for insertion into the socket 12. The rotation of the insert 21 in the socket 12 is allowed.

The socket 12 defines a substantially circular space 121 in the center and a slit 122 communicated with the circular space 121. A quick release 123 is provided on the socket 12 in order to adjust the width of the slit 122 and the dimension of the substantially circular space 121. Thus, the quick release 123 causes the socket 12 to clamp the insert 21. The quick release 123 is conventional and will not be described in detail. A plurality of recesses 124 is defined in the wall of the substantially circular space 121, i.e., the internal side of the socket 12. One of the recesses 124 may be located at a lower portion of the wall while the remaining recesses 124 may be located on two lateral portions of the wall.

In the first embodiment, the optional element 20 is a rack for carrying things. The insert 21 is a cylindrical element that can be inserted into and rotated in the socket 12. The apparatus includes a spring-biased detent 22 installed on the insert 21. The spring-biased detent 22 includes a spring 221 and a ball 222 biased by the spring 221. The ball 221 can be put partially in one of the recesses 124 in order to keep the insert 21 in one of several angular positions in the socket 12. In FIGS. 1 through 3, the ball 222 is put partially in the recess 124

The insert 21 can be loosened up in the socket 12 through operating the quick release 123. The rack 20 can be rotated on the seat tube 11 from the angular position shown in FIGS. 2 and 3 to an angular position shown in FIGS. 4 and 5. The ball 222 can be put partially in any of the recesses 124 located in the lateral portions of the wall in order to keep the angular position shown in FIGS. 4 and 5. The rack 20 is vertical.

Figure 4:
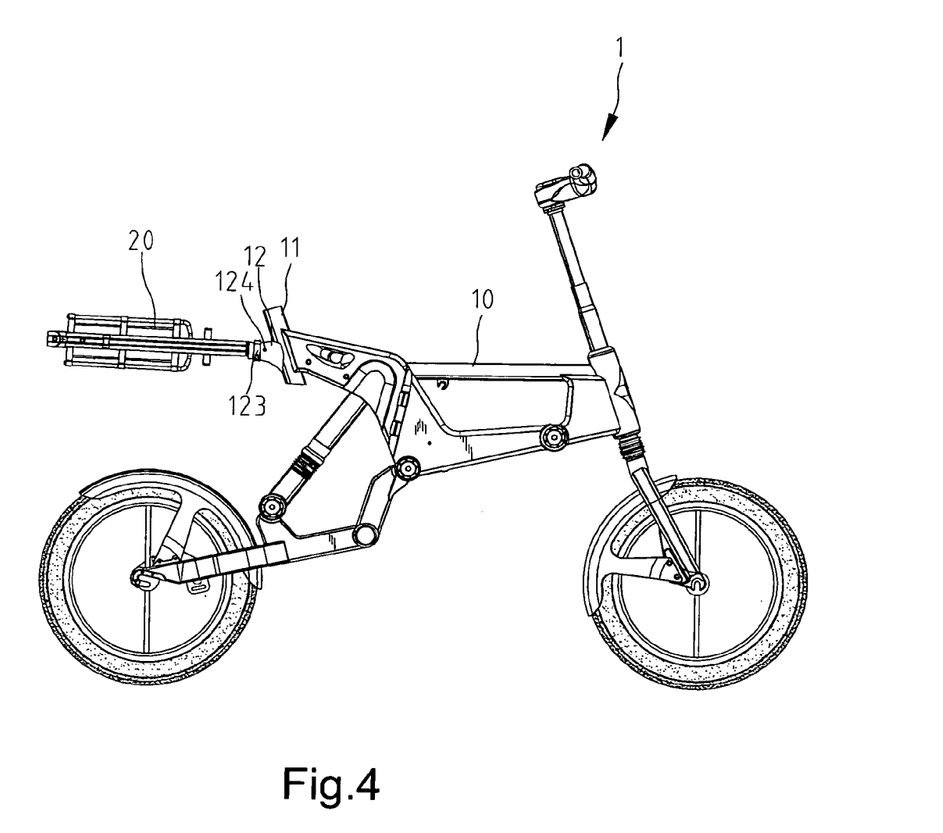
FIG. 4 is a side view of the collapsible bicycle shown in FIG. 1.
Figure 5:
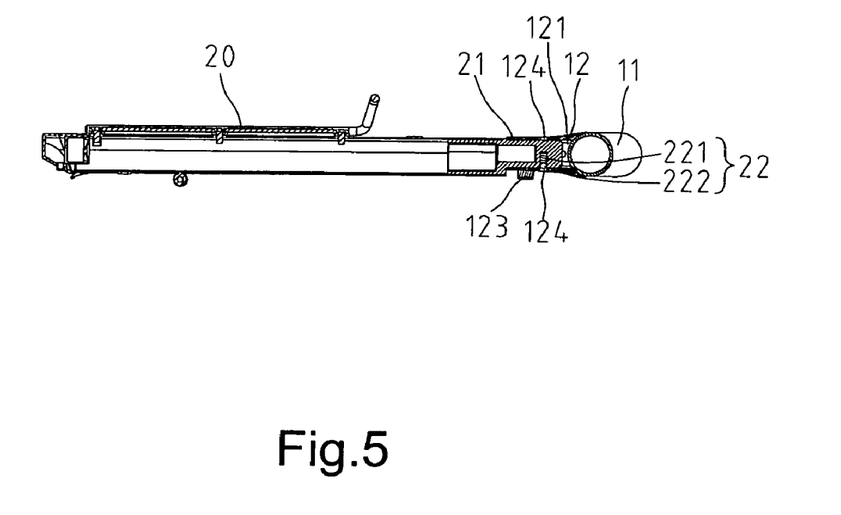
FIG. 5 is a cross-sectional view of the apparatus shown in FIG. 3.
Figure 6:
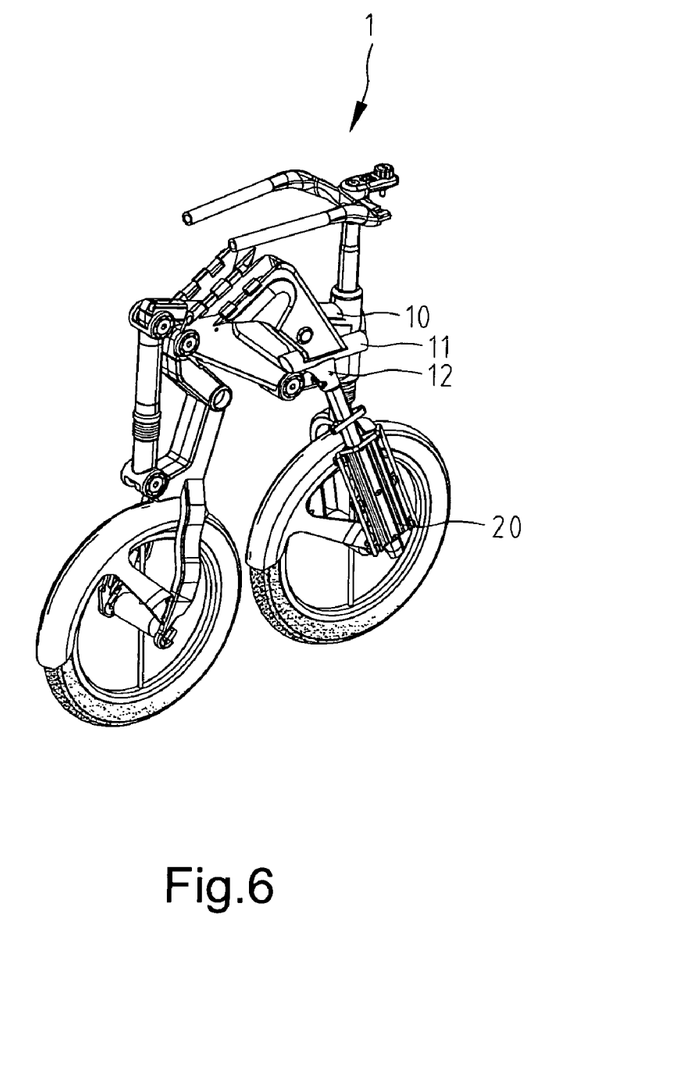
FIG. 6 is a perspective view of the collapsible bicycle shown in FIG. 1 in a collapsed position.
Figure 7:
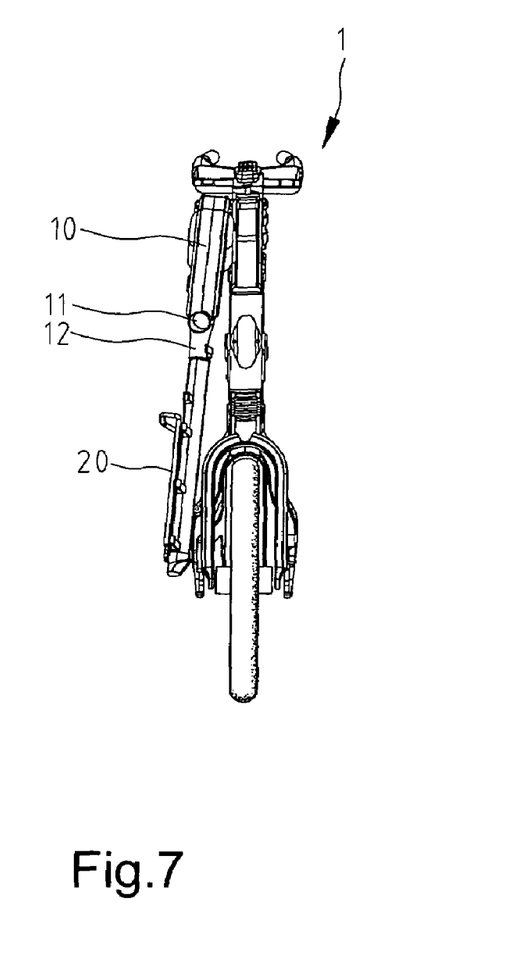
FIG. 7 is a front view of the collapsible bicycle shown in FIG. 6.

After the rack 20 is rotated to the position shown in FIGS. 4 and 5, it does not interfere with collapsing of the collapsible bicycle 1 so that the collapsible bicycle 1 can smoothly be switched to a collapsed position referring to FIGS. 6 and 7. As clearly shown in FIGS. 6 and 7, the rack 20 is close to the front wheel (not numbered) of the collapsible bicycle 1 and only occupies a small space.

Figure 8:
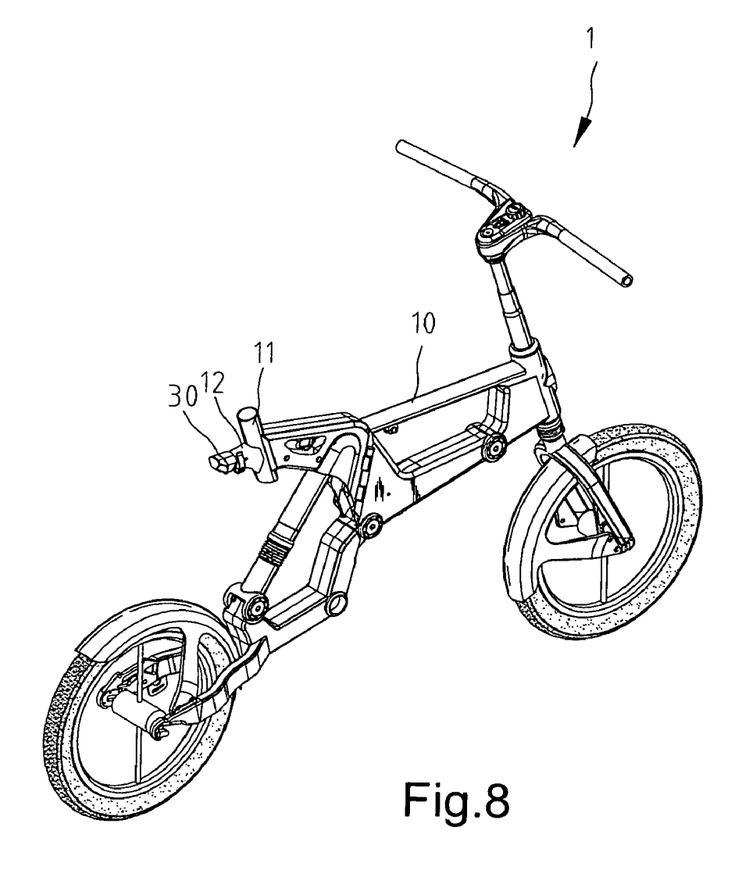
FIG. 8 is a perspective view of a collapsible bicycle equipped with an apparatus for installing an optional element thereon according to a second embodiment of the present invention.

Referring to FIG. 8, according to a second embodiment of the present invention, the optional element is a taillight 30. The insert 21 is formed on the taillight 30. The second embodiment is otherwise identical to the first embodiment.

Figure 9:
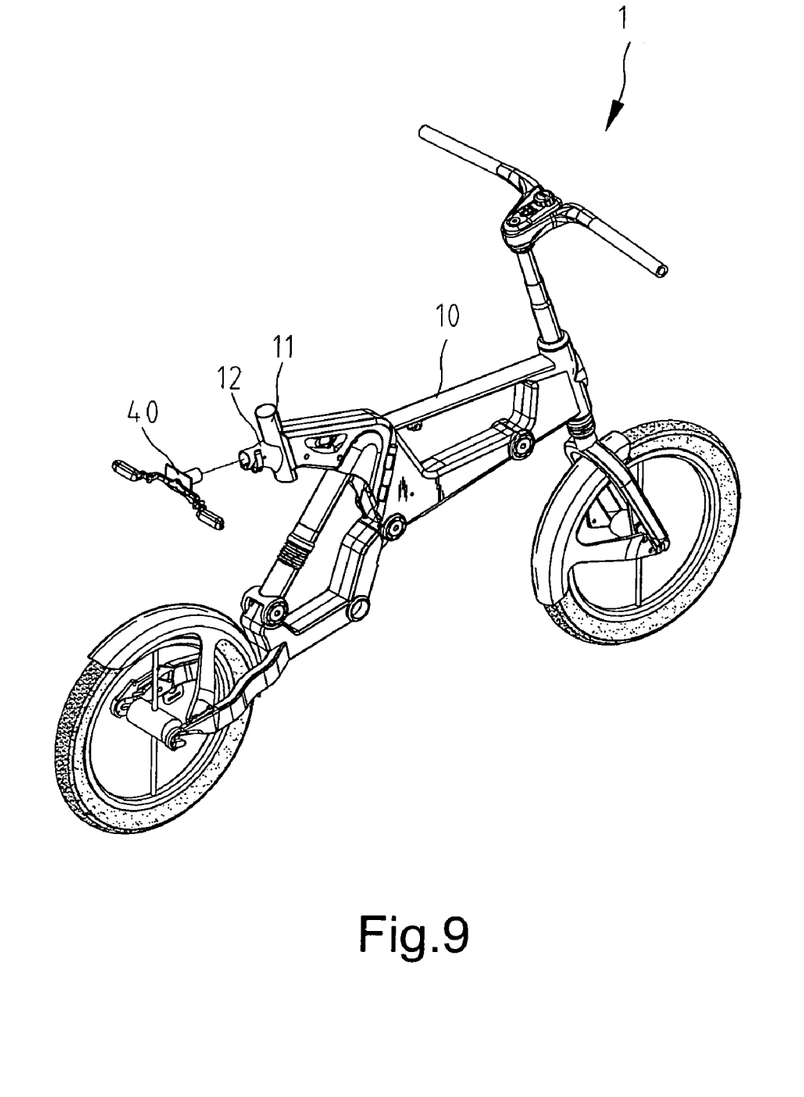
FIG. 9 is a perspective view of a collapsible bicycle equipped with an apparatus for installing an optional element thereon according to a third embodiment of the present invention.

Referring to FIG. 9, according to a third embodiment of the present invention, the optional element is a turn signal 40. The insert 21 is formed on the turn signal 40. The third embodiment is otherwise identical to the first embodiment.

Figure 10:
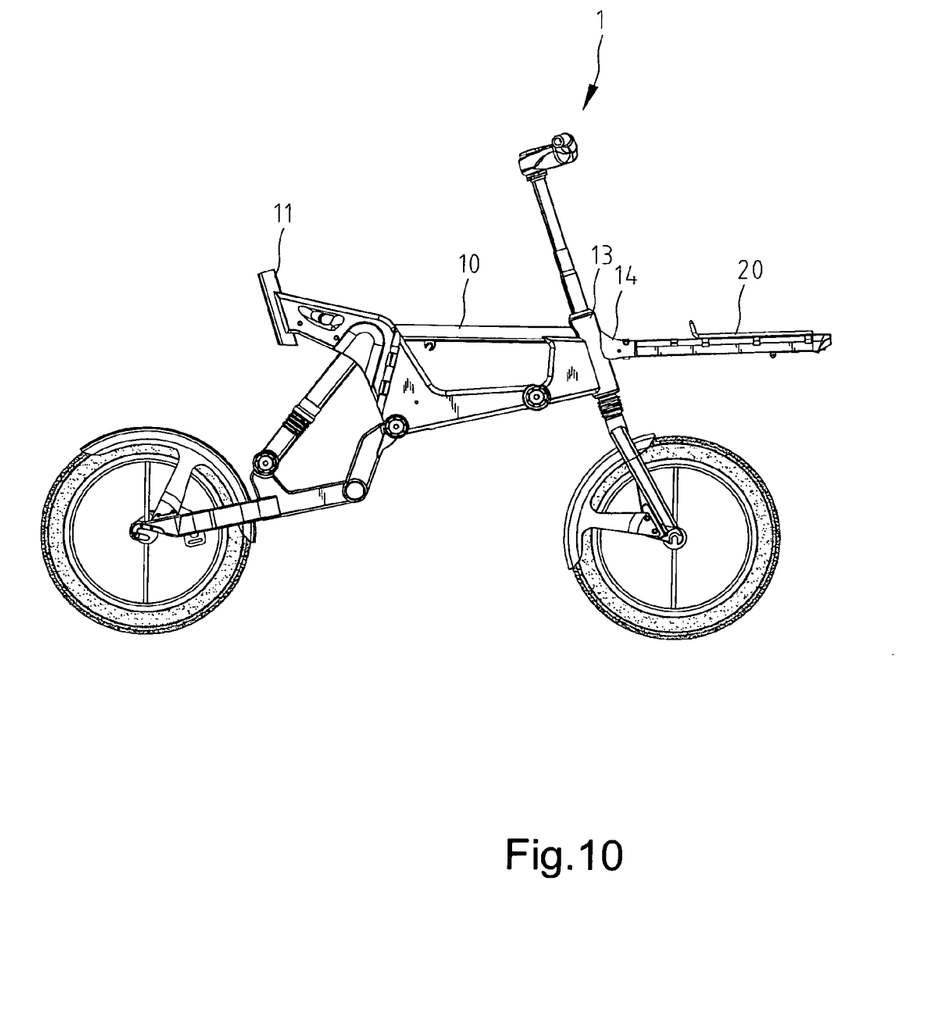
FIG. 10 is a side view of a collapsible bicycle equipped with an apparatus for installing an optional element thereon according to a fourth embodiment of the present invention.
Figure 11:
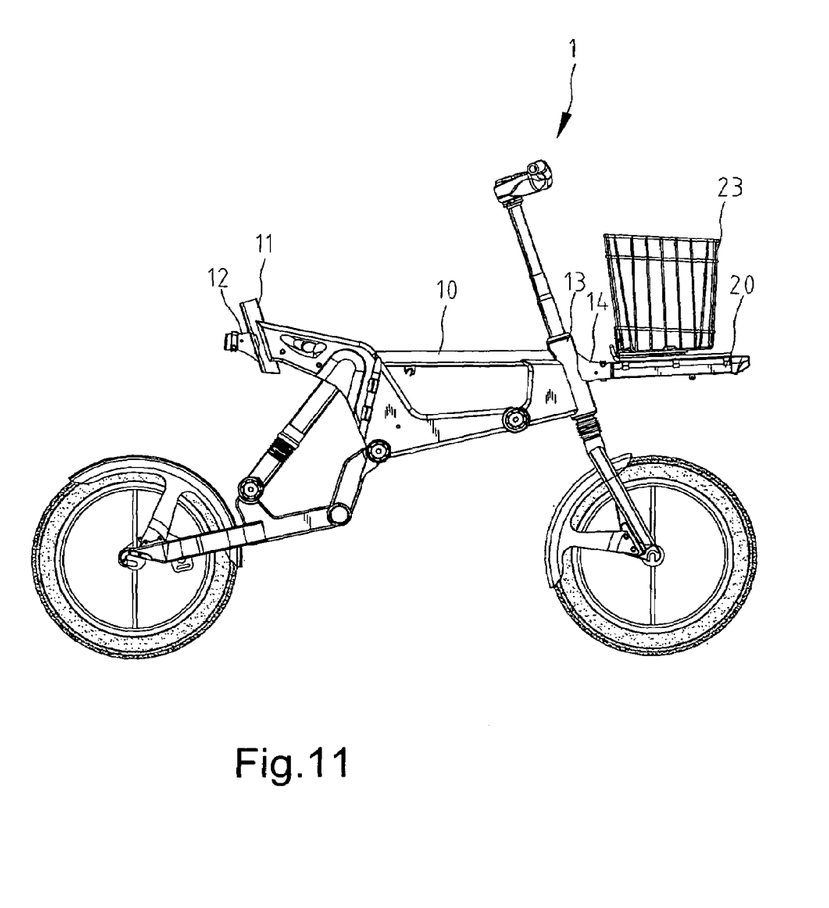
FIG. 11 is a side view of the collapsible bicycle shown in FIG. 10 carrying a basket.

Referring to FIG. 10, according to a fourth embodiment of the present invention, the optional element is a rack 20 that is installed on the head tube 13 of the frame 10 of the bicycle 1. A socket 14 is formed on the head tube 13 instead of the socket 12 formed on the seat tube 11. The fourth embodiment is otherwise identical to the first embodiment. The rack 20 can made with various sizes. Referring to FIG. 1, a basket 23 may be installed on the rack 20 shown in FIG. 10.

The apparatus of the present invention includes several advantageous features. Firstly, the socket 12 or 14 and the insert 21 can be made at low costs. Secondly, the use of the quick release 123 ensures convenient operation. Thirdly, the use of the recesses 124 and the spring-biased detent 22 enables the rack 20 to be kept in various angular positions. Fourthly, the rack 20 can be installed on the head tube 13 instead of the seat tube 11.

The present invention has been described through the detailed description of the embodiments. Those skilled in the art can derive variations from the embodiments without departing from the scope of the present invention. Therefore, the embodiments shall not limit the scope of the present invention defined in the claims.

What is claimed is:

1. An apparatus for installing an optional element to a portion of a frame of a bicycle, the apparatus comprising:
    an insert formed on the optional element;
    a socket extending from the portion of the frame of the bicycle in a longitudinal direction of the bicycle in order to receive the insert so that the rotation and movement of the insert in the socket is allowed;
    a quick release installed on the socket in order to cause the socket to clamp the insert so that the rotation and movement of the insert in the socket is restrained; and
    a positioning device for positioning the insert at various angular positions in the socket, wherein the positioning device comprises:
    a plurality of recesses defined in the internal side of the socket; and
    a spring-biased detent installed on the insert for insertion in one of the plurality of recesses.

2. The apparatus according to claim 1 wherein the socket defines a space for receiving the insert and a slit communicated with the space, wherein the quick release is operable to adjust the width of the slit and the dimension of the space.

3. The apparatus according to claim 1 wherein the spring-biased detent comprises a spring and a ball biased by the spring.

4. The apparatus according to claim 1 wherein the portion of the frame of the bicycle is a head tube.

5. The apparatus according to claim 1 wherein the optional element is a taillight.

6. The apparatus according to claim 1 wherein the optional element is a turn signal.

7. The apparatus according to claim 1 with the positioning device positioning the insert at a first position and a second position rotated 90° from the first position.

8. The apparatus according to claim 7 wherein the portion of the frame of the bicycle is a seat tube.

9. The apparatus according to claim 7 wherein the optional element is a rack.

* * * * *